(12) United States Patent
Olarig

(10) Patent No.: US 12,399,657 B2
(45) Date of Patent: *Aug. 26, 2025

(54) HIGH-SPEED DATA TRANSFERS THROUGH STORAGE DEVICE CONNECTORS

(71) Applicant: Samsung Electronics Co., Ltd., Suwon-si (KR)

(72) Inventor: Sompong Paul Olarig, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,883

(22) Filed: Nov. 14, 2022

(65) Prior Publication Data

US 2023/0074672 A1     Mar. 9, 2023

Related U.S. Application Data

(63) Continuation of application No. 16/745,332, filed on Jan. 16, 2020, now Pat. No. 11,500,593.

(Continued)

(51) Int. Cl.
*G06F 3/06* (2006.01)

(52) U.S. Cl.
CPC .......... *G06F 3/0688* (2013.01); *G06F 3/0604* (2013.01); *G06F 3/0658* (2013.01); *G06F 3/0659* (2013.01); *G06F 3/0679* (2013.01)

(58) Field of Classification Search
CPC .... G06F 3/0688; G06F 3/0604; G06F 3/0658; G06F 3/0659; G06F 3/0679; G06F 3/06
See application file for complete search history.

(56) References Cited

U.S. PATENT DOCUMENTS

| 7,471,512 B1 | 12/2008 | Strickland |
| 7,581,990 B2 | 9/2009 | Kirk et al. |

(Continued)

FOREIGN PATENT DOCUMENTS

| WO | WO-2015195329 A2 * | 12/2015 | ........... G06F 13/364 |
| WO | WO-2019070361 A1 * | 4/2019 | ........... G06F 13/364 |

OTHER PUBLICATIONS

Final Office Action for U.S. Appl. No. 16/745,332, mailed Apr. 11, 2022.

(Continued)

*Primary Examiner* — Pierre Michel Bataille
(74) *Attorney, Agent, or Firm* — Renaissance IP Law Group LLP

(57) ABSTRACT

Data storage systems, devices and methods may use a switch board configured to communicate using a high-speed multi-level signaling protocol, and a midplane having one or more multi-protocol storage device connectors configured to couple the midplane to one or more storage devices, wherein the midplane may be coupled to the switch board and configured to enable the one or more storage devices to communicate with the switch board through the one or more multi-protocol storage device connectors using the high-speed multi-level signaling protocol. The midplane may be coupled to the switch board through one or more high-speed connectors. One or more re-timers may be coupled between one or more of the high-speed connectors and one or more of the multi-protocol storage device connectors. One or more cables may be used to transfer data to and from the multi-protocol storage device connectors.

20 Claims, 12 Drawing Sheets

Related U.S. Application Data

(60) Provisional application No. 62/924,689, filed on Oct. 22, 2019, provisional application No. 62/821,429, filed on Mar. 20, 2019.

(56) References Cited

U.S. PATENT DOCUMENTS

| | | | |
|---|---|---|---|
| 8,566,507 B2* | 10/2013 | Sprinkle | G06F 3/0619 |
| | | | 711/E12.001 |
| 9,705,255 B2 | 7/2017 | Atkinson et al. | |
| 10,249,991 B1* | 4/2019 | Mohan | H01R 13/40 |
| 10,411,923 B2* | 9/2019 | Stojanovic | H04L 25/03019 |
| 10,707,626 B2 | 7/2020 | Cartier, Jr. et al. | |
| 10,783,269 B1* | 9/2020 | Shraer | H04L 67/1097 |
| 2011/0312196 A1* | 12/2011 | Millard | H05K 1/147 |
| | | | 439/67 |
| 2016/0013958 A1* | 1/2016 | Mishra | H04L 25/4927 |
| | | | 375/287 |
| 2016/0261060 A1* | 9/2016 | Sechrist | H04Q 1/06 |
| 2016/0328347 A1* | 11/2016 | Worley | G06F 13/385 |
| 2016/0371409 A1* | 12/2016 | Dmitriev-Zdorov | G06F 30/20 |
| 2018/0032462 A1 | 2/2018 | Olarig et al. | |
| 2018/0032463 A1* | 2/2018 | Olarig | G06F 13/4068 |
| 2018/0032471 A1 | 2/2018 | Olarig | |
| 2018/0173652 A1 | 6/2018 | Olarig et al. | |
| 2018/0293407 A1* | 10/2018 | Wu | G06F 21/602 |
| 2019/0114278 A1 | 4/2019 | Olarig et al. | |
| 2019/0171602 A1 | 6/2019 | Olarig et al. | |
| 2020/0043565 A1* | 2/2020 | Yun | G11C 29/38 |
| 2020/0076720 A1* | 3/2020 | Riani | H04L 43/50 |
| 2020/0183862 A1* | 6/2020 | Liu | G06F 13/1668 |
| 2020/0243511 A1* | 7/2020 | Gupta | G11C 8/08 |
| 2020/0379933 A1* | 12/2020 | Worley | G06F 13/4022 |
| 2022/0158346 A1* | 5/2022 | Marr, Jr. | H01Q 3/38 |

OTHER PUBLICATIONS

Final Office Action for U.S. Appl. No. 16/745,332, mailed Jun. 30, 2021.

Microsemi, "White Paper What's New in 24G SAS," Jul. 2018, 12 pages.

Notice of Allowance for U.S. Appl. No. 16/745,332, mailed Jul. 13, 2022.

Office Action for U.S. Appl. No. 16/745,332, mailed Dec. 14, 2020.

Office Action for U.S. Appl. No. 16/745,332, mailed Oct. 14, 2021.

* cited by examiner

HIGH-SPEED DATA TRANSFERS THROUGH STORAGE DEVICE CONNECTORS

This application is a continuation of U.S. patent application Ser. No. 16/745,332, filed Jan. 16, 2020, which claims priority to, and the benefit of, U.S. Provisional Patent Application Ser. No. 62/821,429, filed Mar. 20, 2019, and U.S. Provisional Patent Application Ser. No. 62/924,689, filed Oct. 22, 2019, all of which are incorporated by reference.

BACKGROUND

1. Field

This disclosure relates generally to data storage systems, and more specifically to systems and methods for supporting data transfers through storage device connectors using high-speed protocols.

2. Related Art

Data storage devices such as hard disk drives (HDDs), solid state drives (SSDs), and the like, can be connected to storage systems through connectors that may enable the storage devices to be added to or removed from the system for expansion, maintenance, repair, upgrade, etc. One type of storage device connector known as a U.2 connector may be used in data storage systems, for example, in data centers and other large-scale deployments. U.2 connectors may enable a single connector design to be used with multiple storage protocols including Serial ATA (SATA), Serial Attached SCSI (SAS) and Non-Volatile Memory Express (NVMe).

SUMMARY

A storage device may include a multi-protocol storage device connector, and a storage controller configured to control data transfers to and from a storage medium through the multi-protocol storage device connector, wherein the storage controller may be coupled to the multi-protocol storage device connector through an interface for a high-speed multi-level signaling protocol. The multi-protocol storage device connector may be a U.2 connector. The U.2 connector may be a serial attached small computer system interface generation four (SAS4) capable U.2 connector. The high-speed multi-level signaling protocol may include an Ethernet protocol with pulse amplitude modulation level-4 (PAM4) modulation. The Ethernet protocol may be a 50 Gb Ethernet protocol. The high-speed multi-level signaling protocol may include a PCIe protocol such as PCIe Gen 6. The interface may be configured to implement a non-volatile memory express over fabric (NVMe-oF) protocol. The multi-protocol storage device connector may be compliant with the Small Form Factor 8639 (SFF-8639) specification.

A data storage system may include a switch board configured to communicate using a high-speed multi-level signaling protocol, and a midplane having one or more multi-protocol storage device connectors configured to couple the midplane to one or more storage devices, wherein the midplane may be coupled to the switch board and configured to enable the one or more storage devices to communicate with the switch board through the one or more multi-protocol storage device connectors using the high-speed multi-level signaling protocol. The midplane may be coupled to the switch board through one or more high-speed connectors. The midplane may include a circuit board having conductive traces configured to couple one or more of the high-speed connectors to one or more of the multi-protocol storage device connectors. The midplane may include one or more re-timers coupled between one or more of the high-speed connectors and one or more of the multi-protocol storage device connectors. One or more of the high-speed connectors and one or more of the multi-protocol storage device connectors may be coupled through one or more cables. The one or more cables may include one or more axial cables. One or more of the multi-protocol storage device connectors on the midplane may be coupled to the switch board through one or more cables. One or more of the cables may include a connector at one end configured to connect the cable to the switch board. One or more of the cables may include a connector at one end configured to connect the cable to the midplane.

A method for transferring data between a switch board and a storage device may include, transferring data between the switch board and a midplane using a high-speed multi-level signaling protocol, and transferring data between the midplane and the storage device using the high-speed multi-level signaling protocol, wherein the storage device may be coupled to the midplane through a multi-protocol storage device connector. The data may be transferred between the switch board and the midplane through one or more high-speed connectors. The method may further include re-timing signals for the high-speed multi-level signaling protocol on the midplane or the switch board. The data may be transferred between the switch board and the midplane through one or more conductive traces or cables.

A data storage midplane may include a circuit board, and one or more multi-protocol storage device connectors configured to couple the circuit board to one or more storage devices, wherein the midplane may be configured to enable data transfers between a switch board and a storage device through one of the multi-protocol storage device connectors using a high-speed multi-level signaling protocol. The midplane may further include one or more high-speed connectors configured to couple the midplane to the switch board and transfer data using the high-speed multi-level signaling protocol. The circuit board may include conductive traces configured to couple one or more of the high-speed connectors to one or more of the multi-protocol storage device connectors. The midplane or the switch board may include one or more re-timers coupled between one or more of the high-speed connectors and one or more of the multi-protocol storage device connectors. One or more of the high-speed connectors and one or more of the multi-protocol storage device connectors may be coupled through one or more cables. The one or more cables may include one or more axial cables. The midplane may be configured to couple one or more of the multi-protocol storage device connectors to the switch board through one or more cables. The circuit board may include one or more connectors for the one or more cables.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured.

DETAILED DESCRIPTION

Figure 1:
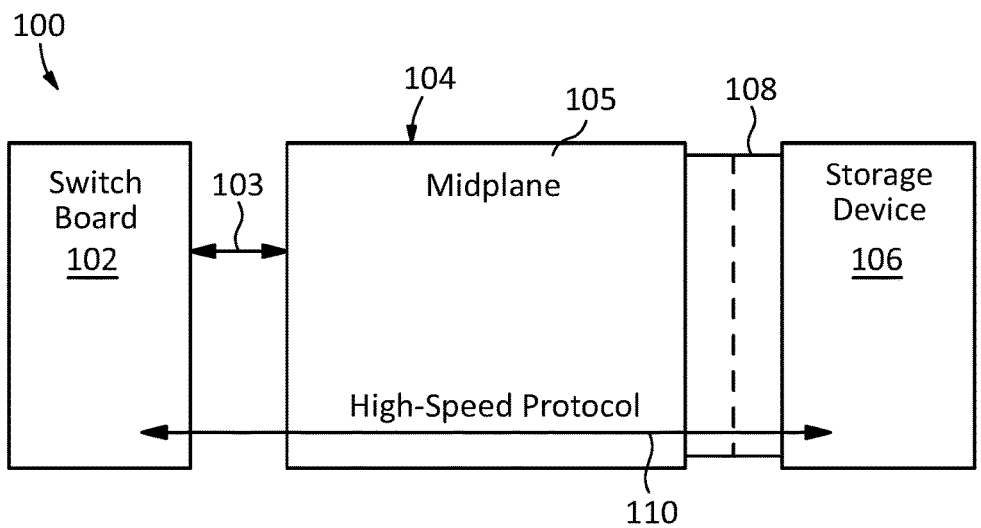
FIG. 1 illustrates an embodiment of a data storage system according to this disclosure.

U.2 connectors may be manufactured in accordance with the SFF-8639 specification which is published by the Small Form Factor (SFF) Committee of the Storage Networking Industry Association (SNIA). The SFF-8639 specification defines the mechanical specifications and general requirements for U.2 plug and receptacle connectors for storage devices. A physical U.2 connection typically involves a U.2 plug on the storage device that may connect to a U.2 socket on a circuit board or cable. U.2 connectors can accommodate three families of storage protocols: SATA, SAS and NVMe, which may use Peripheral Component Interconnect Express (PCIe) as an underlying protocol, U.2 connectors may also support variants of these storage protocols.

U.2 connectors may also be used to transfer data to and from storage devices using network protocols such as Ethernet, Fibre Channel, InfiniBand, and others. For example, a storage device may be connected to a storage system through a U.2 connector and configured to transfer data using NVMe over Fabric (NVMe-oF) which is a specification that enables NVMe protocol to be transmitted over network fabrics such as Ethernet, Fibre Channel, InfiniBand, and others. This may be accomplished, for example, by using pins of the U.2 connector, which may normally be defined for use with a SAS or PCIe protocol, for implementing a channel for the network fabric.

The ability of the U.2 connector to accommodate these different protocols, for example, in data centers and other large-scale deployments, has resulted in adoption of the connector design and resulting mass production. This mass production, in turn, has provided economies of scale which have driven down the cost of U.2 connectors and made them available from different vendors.

Communication protocols may be revised periodically to provide higher data transfer rates with each generation of the protocol. As data transfer rates and accompanying signaling speeds increase, the connectors used for each protocol often need to be enhanced to accommodate the higher signal speeds. In some situations, the connectors may be enhanced through the use of different materials and/or manufacturing techniques and/or mechanical refinements without changing the overall mechanical design of the connectors. In other situations, it may not be possible or economically feasible to accommodate higher signal speeds without changing the overall mechanical design of the connectors.

As the speed of a communication protocol increases with each new generation, different techniques for encoding, signaling, modulation, sampling, receiver equalization, error correction, etc., may be adopted to enable higher data transfer rates. A group of signaling techniques known as multi-level signaling may increase the rate at which a communication protocol transfers data. Multi-level signaling may involve the use of more than two binary signal levels, e.g., signal levels between logic 0 and logic 1, to represent data. For example, four-level pulse amplitude modulation (PAM4) is a type of multi-level signaling that may use four different voltage levels to enable two bits of data to be represented by one symbol. This may effectively double the data transfer rate of a communication protocol, but it may result in significantly increased cost, complexity, and/or noise susceptibility. Therefore, multi-level signaling is typically not adopted until the challenges associated with multi-level signaling are outweighed by the need for higher data transfer rates. This may not occur, for example, until a protocol reaches a realm of high-speed operation in which data transfer rates may be specified in tens of gigabits per second. For example, PAM4 signaling was adopted in the transition from 25 Gb to 50 Gb Ethernet.

As the data transfer speeds of communication protocols increase, and multi-level signaling becomes more widespread, the U.2 connector may have reached a practical limit using conventional implementation techniques. However, with the wide availability and low cost of U.2 connectors, it may be beneficial to continue using U.2 connectors with high-speed communication protocols such as those that use multi-level signaling.

FIG. 1 illustrates an embodiment of a data storage system according to this disclosure. The system 100 shown in FIG. 1 may include a switch board 102, a midplane 104, and one or more storage devices 106. Each of the storage devices 106 may be connected to the midplane 104 with a multi-protocol storage device connector 108. The midplane 104 may be coupled to the switch board 102 and configured to enable the one or more storage devices 106 to communicate with the switch 102 board using a high-speed communication protocol 110 that may use multi-level signaling.

The switch board 102 may include any type of communication apparatus having at least one operating mode that uses a high-speed communication protocol with multi-level signaling. For example, in some embodiments, the switch board 102 may include an Ethernet switch capable of operating at 50 Gb speeds which may use pulse amplitude modulation level-4 (PAM4) signaling. In other embodiments, the switch board 102 may include a PCIe switch capable of operating at PCIe 6.0 speeds which may also use PAM4 signaling. In some additional embodiments, the switch board 102 may include a PCIe switch capable of operating at PCIe 4.0 or 5.0 speeds. In yet other embodiments, the switch board 102 may include combinations of these and/or other switches and/or communication apparatus.

In some embodiments, an Ethernet or other switch on switch board 102 may be a single node of a larger switch hierarchy or switch fabric. In other embodiments, the switch board 102 may include multiple switch nodes and/or interconnects for all or a portion of a switch fabric structure. Some embodiments may include additional switch boards. For example, multiple switch boards may be configured to provide each of the storage devices 106 with multiple network or interconnect ports.

The midplane 104 may include any type of circuit board 105 configured to couple the one or more storage devices 106 to the switch board 102. This may include a standard midplane configuration in which the one or more storage device connectors 108 are arranged on one side of the board 105 and one or more other connectors or connection apparatus for coupling the midplane to the switch board 102 are arranged on the other side of the board 105. As used herein, a midplane may also refer to any other type of circuit board configuration that may be used to physically and electrically couple the one or more storage devices 106 to the switch board 102. This may include, for example, a backplane configuration in which both sets of connectors or connection apparatus are arranged on the same side of the board 105. The midplane 104 may include a unitary circuit board 105 or it may be implemented with multiple boards and/or sets of connectors or connection apparatus.

The one or more storage devices 106 may include hard disk drives (HDDs), solid state drives (SSDs), and/or any other type of storage device based on magnetic, solid state, optical, or any other type of data storage technology. The one or more storage devices 106 may implement any type of storage interface and/or protocol having at least one operating mode that uses a high-speed protocol with multi-level signaling. For example, one or more of the storage devices 106 may be capable of transferring data through the connector 108 according to an NVMe over fabric (NVMe-oF) specification using 50 Gb Ethernet as the underlying fabric protocol which may use PAM4 signaling. As another example, one or more of the storage devices 106 may be capable of transferring data through the connector 108 according to an NVMe specification using PCIe 6.0 as the underlying protocol which may use PAM4 signaling.

The one or more storage device connectors 108 may include a multi-protocol storage device connector such as a U.2 connector. Although a connector 108 may be illustrated as a single component, it may typically include a plug or header portion, which may be included as part of a storage device 106, and a receptacle portion, which may be included as part of the midplane 104.

FIGS. 2-6 illustrate additional embodiments of data storage systems showing examples of techniques in which the physical and electrical coupling between a switch board 102 and midplane 104, shown by arrow 103 in FIG. 1, may be implemented according to this disclosure.

Figure 2:
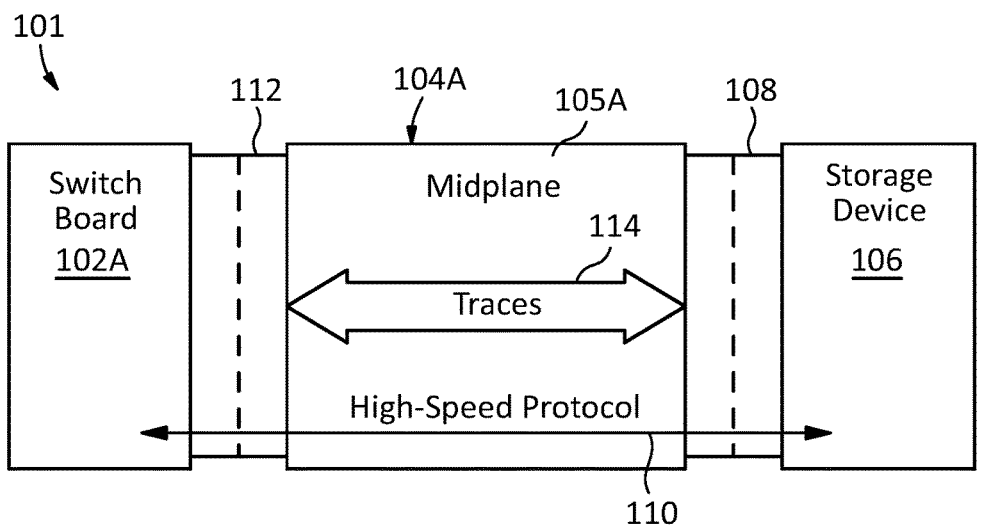
FIG. 2 illustrates an embodiment of a data storage system in which a midplane may be connected to a switch board through one or more high-speed connectors according to this disclosure.

FIG. 2 illustrates an embodiment of a data storage system 101 in which a midplane 104A may be connected to a switch board 102A through one or more high-speed connectors 112. The one or more high-speed connectors 112 may include a mechanical design and selection of materials that may enable the connector to accommodate a high-speed communication protocol with multi-level signaling such as 50 Gb Ethernet. Although a high-speed connector 112 may be illustrated as a single component, it may typically include two different mating portions with one portion mounted on the switch board 102A and the other portion mounted on the circuit board 105A of the midplane 104A.

The one or more high-speed connectors 112 may be electrically connected to the one or more storage device connectors 108 through traces, vias, and/or other conductive structures 114 on the circuit board 105A which may form the foundation of the midplane 104A. The traces, vias, and/or other conductive structures 114 which may be arranged, for example, as transmission lines such as slotlines, striplines, microstrips, and the like, on the circuit board 105A that may be capable of carrying the high-speed communication protocol 110 that may use multi-level signaling.

Figure 3:
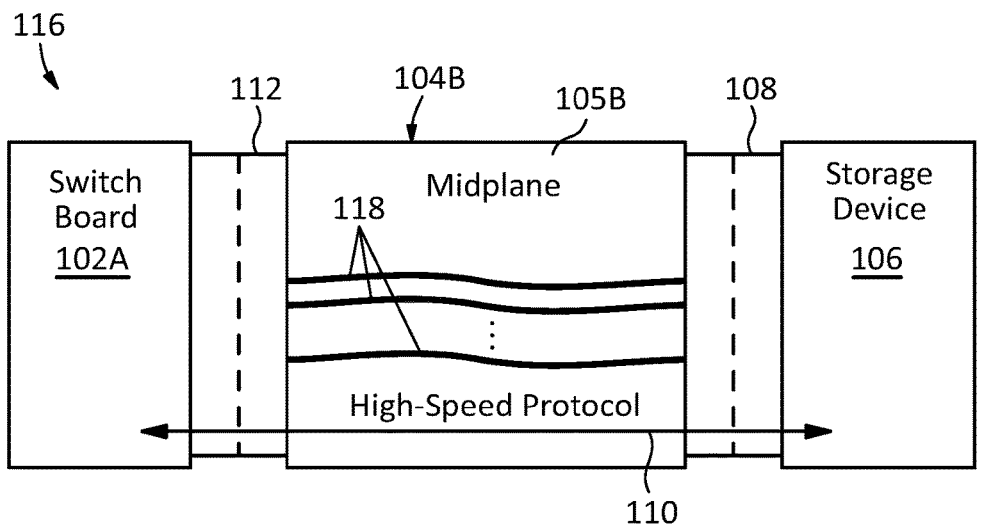
FIG. 3 illustrates an embodiment of a data storage system in which a midplane may use one or more cables according to this disclosure.

FIG. 3 illustrates another embodiment of a data storage system 116 in which a midplane 104B may be connected to a switch board 102A through one or more high-speed connectors 112. In the embodiment illustrated in FIG. 3, however, the one or more high-speed connectors 112 may be electrically connected to the one or more storage device connectors 108 at least partially through one or more cables 118. The cables 118 may include coaxial cables, twin-axial cables, and/or any other cable-like conductive structures that may be capable of carrying the high-speed communication protocol 110 that may use multi-level signaling. One or more of the cables 118 may include cable-to-board connectors at either or both ends which may be snapped, soldered, crimped or otherwise connected to the circuit board 105B to make electrical and/or mechanical connections. Alternatively, or additionally, one or more of the cables 118 may be connected at one or both ends to one or more of the high-speed connectors 112 and/or storage device connectors 108. One or more of the cables 118 may include cable-to-connector connectors at either or both ends which may be snapped, soldered, crimped or otherwise connected to any of the high-speed connectors 112 and/or storage device connectors 108 to make electrical and/or mechanical connections.

Figure 4:
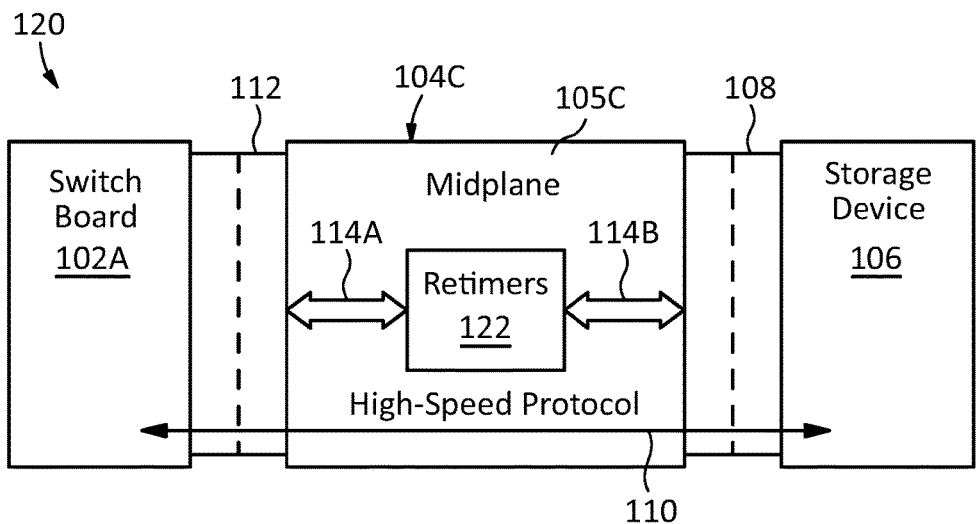
FIG. 4 illustrates an embodiment of a data storage system in which a midplane may use one or more re-timers according to this disclosure.

FIG. 4 illustrates another embodiment of a data storage system 120 in which a midplane 104C may be connected to a switch board 102A through one or more high-speed connectors 112. In the embodiment illustrated in FIG. 4, however, the midplane 1040 may include one or more re-timers 122 connected between one or more of the high-speed connectors 112 and one or more of the storage device connectors 108. The re-timers 122 may by capable of re-timing the high-speed communication protocol with multi-level signaling 110 in either or both directions. The re-timers 122 may be connected to one or more of the high-speed connectors 112 through conductors 114A. The re-timers 122 may be connected to one or more of the storage device connectors 108 through conductors 114B. The conductors 114A and 114B may be implemented as traces, vias, and/or other conductive structures which may be arranged, for example, as transmission lines such as slotlines, striplines, microstrips, and the like, on the circuit board 1050 that may be capable of carrying the high-speed communication protocol 110 that may use multi-level signaling. Alternatively, or additionally, one or more of the re-timers 122 may be connected to one or more of the high-speed connectors 112 and/or one or more of the storage device connectors 108 at least partially through one or more cables as described above with respect to the system 116 illustrated in FIG. 3.

Figure 5:
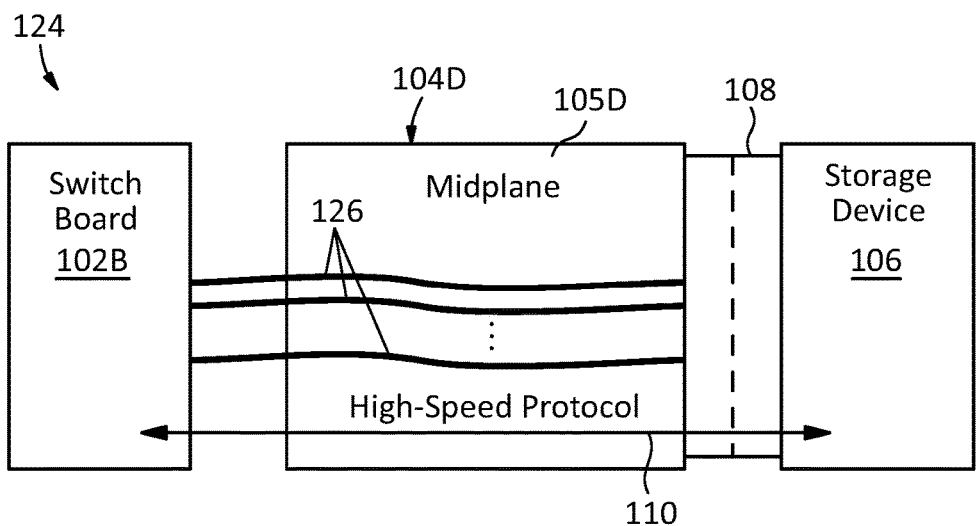
FIG. 5 illustrates an embodiment of a data storage system in which a midplane may be connected to a switch board through one or more cables according to this disclosure.

FIG. 5 illustrates an embodiment of a data storage system 124 in which a midplane 104D may be connected to a switch board 102B at least partially through one or more cables 126. The cables 126 may include coaxial cables, twin-axial cables, and/or any other cable-like conductive structures that may be capable of carrying the high-speed communication protocol 110 that may use multi-level signaling. One or more of the cables 126 may include cable-to-board connectors at either or both ends which may be snapped, soldered, crimped or otherwise connected to the circuit board 105D and/or the switch board 102E to make electrical and/or mechanical connections. Alternatively, or additionally, one or more of the cables 126 may be connected at one or both ends to one or more of the storage device connectors 108 or one or more headers or other connectors such as a network or storage interface connectors on the switch board 102B. One or more of the cables 126 may include cable-to-connector connectors at either or both ends which may be snapped, soldered, crimped or otherwise connected to any of storage device connectors 126 and or other connectors such as a network or storage interface connectors on the switch board 102B to make electrical and/or mechanical connections.

The one or more cables 126 may be combined one or more connectors to create hybrid configurations of cables and connectors to couple the midplane 104D to the switch board 102B. For example, one or more connectors may be used to provide power and/or lower speed connections and/or a mechanical connection between the midplane 104D and the switch board 102B, while the one or more cables 126 may provide high-speed signal connections.

Figure 6:
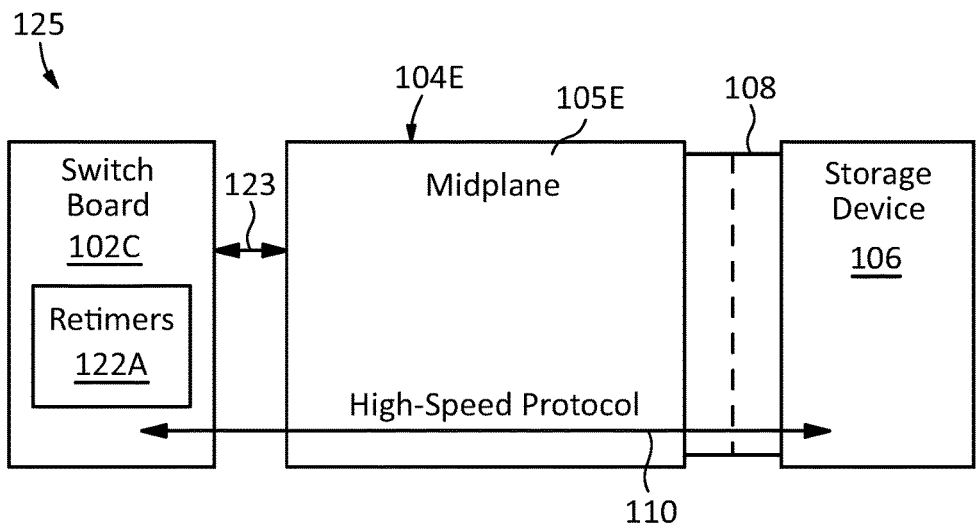
FIG. 6 illustrates an embodiment of a data storage system in which one or more re-timers may be located on a switch board according to this disclosure.

FIG. 6 illustrates another embodiment of a data storage system 125 in which one or more re-timers 122A may be located on the switch board 102D instead of, or in addition to, the midplane 104E. Locating re-timers 122A on the switch board 102D may be beneficial, for example, in implementations in which the switch board may be easier to replace than the midplane. Thus, active circuitry in the re-timers 122A may be easier to replace. The physical and electrical coupling between the switch board 102D and midplane 104E, shown by arrow 123, may be implemented with any suitable arrangement of components such as, for example, any of the connectors, conductive traces, cables, and the like, described in the context of the embodiments above and below according to this disclosure.

Figure 7:
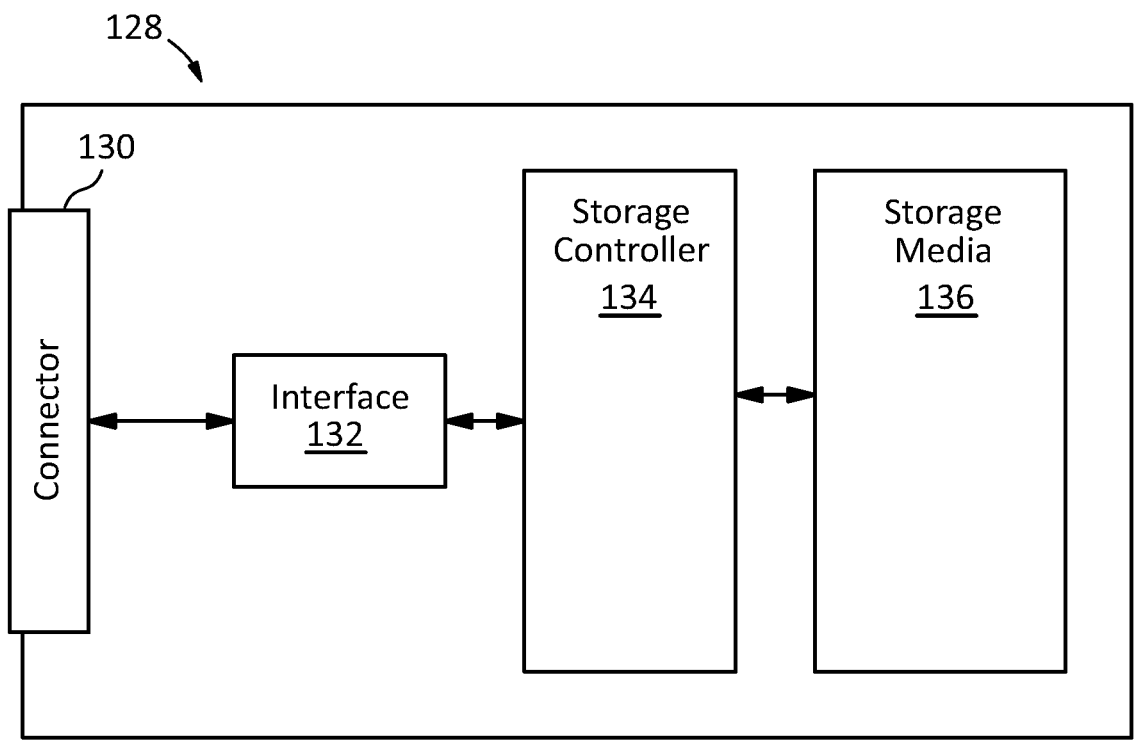
FIG. 7 illustrates an embodiment of a storage device according to this disclosure.

FIG. 7 illustrates an embodiment of a storage device 128 according to this disclosure. The storage device 128 may be used, for example, as one of the storage devices 106 illustrated in FIGS. 1-6, The storage device 128 may include a storage device connector 130, a communication interface 132, a storage controller 134 and storage media 136. The storage device connector 130 may include a multi-protocol storage device connector such as a U.2 connector. For example, the connector 130 may be implemented as a U.2 plug which may enable the storage device 128 to be plugged into a corresponding U.2 receptacle on a midplane or other apparatus in a data storage system. The communication interface 132 may provide access to the storage controller 134 through the storage device connector 130. The communication interface 132 may implement a high-speed communication protocol that uses multi-level signaling such as 50 Gb Ethernet or PCIe 6.0. The storage media 136 may be implemented with magnetic, solid state, optical, or any other type of data storage technology. The communication interface 132 and a storage controller 134 may be implemented as separate components or integrated into a single component. Either of the communication interface 132 and storage controller 134 may be implemented in hardware, software or any combination thereof.

Figure 8:
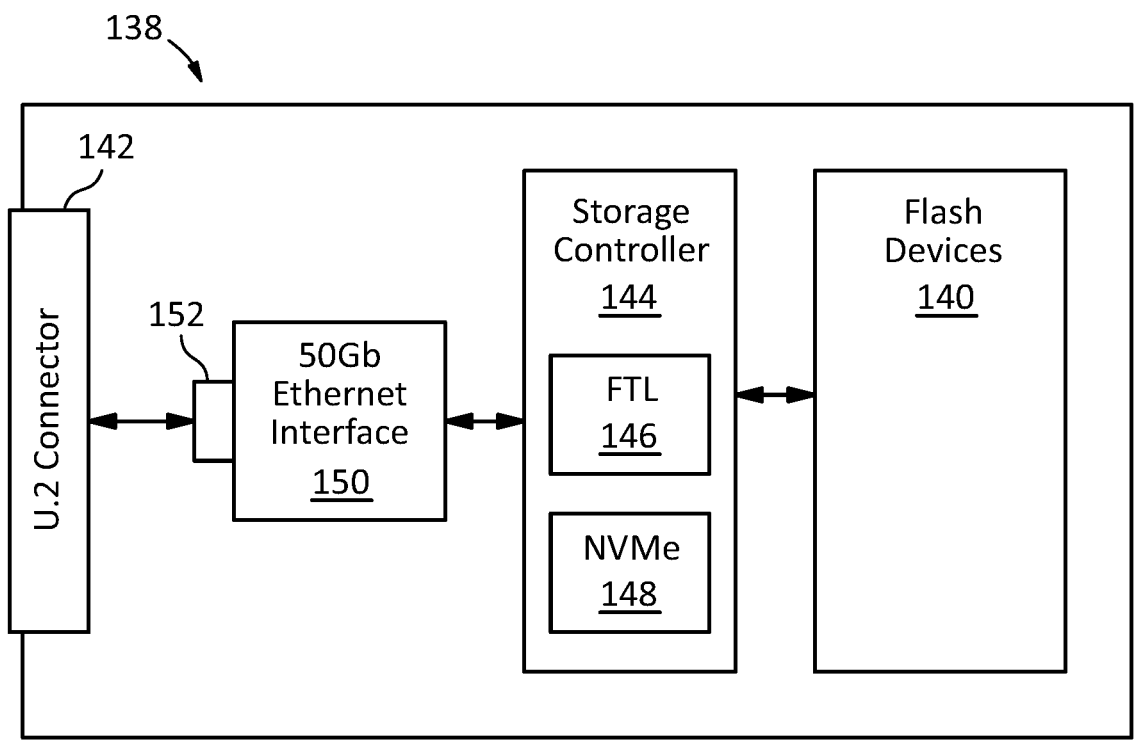
FIG. 8 illustrates another embodiment of a storage device according to this disclosure.

FIG. 8 is a block diagram of another embodiment of a storage device 138 illustrating some possible implementation details according to this disclosure. In this example embodiment, the storage device 138 may be implemented as a solid state drive (SSD) using an array of flash memory devices 140 as the storage media, and a U.2 connector 142 as the storage device connector 142. A storage controller 144 may include a flash translation layer (FTL) 146 as well as an NVMe manager 148. A communication interface 150 may be implemented, for example, with a field programmable gate array (FPGA) or application specific integrated circuit (ASIC) configured to implement one or more 50 Gb Ethernet ports 152 accessible through the U.2 connector 142. The communication interface 150 may enable the NVMe storage protocol from the storage controller 144 to be transported through the one or more 50 Gb Ethernet ports 152, thereby implementing NVMe-oF. In this configuration, pins of the U.2 connector which may normally be defined for use with a SAS or PCIe protocol may be used as a data plane for the one or more Ethernet ports 152, while unused pins normally defined for use as PCIe lanes may be used for a control plane for the one or more Ethernet ports 152.

Figure 9:
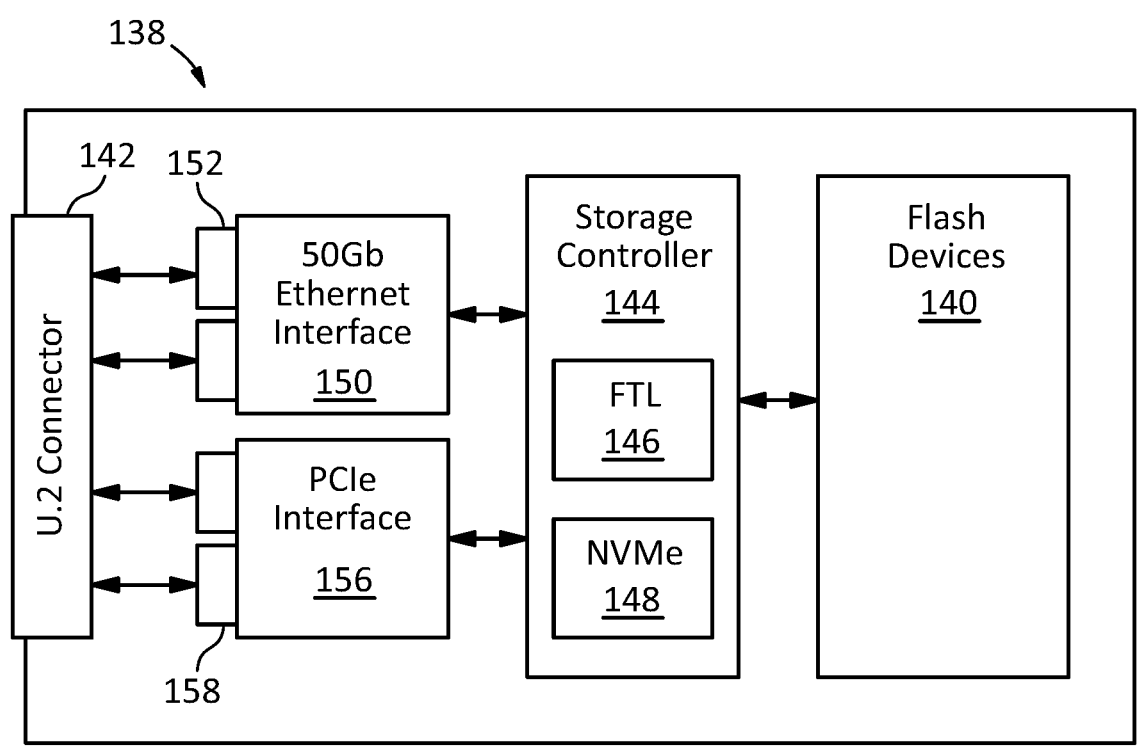
FIG. 9 illustrates another embodiment of a storage device according to this disclosure.

FIG. 9 is a block diagram of another embodiment of a storage device 138 illustrating some additional possible implementation details according to this disclosure. The device 138 illustrated in FIG. 9 may be similar to the embodiment illustrated in FIG. 8 but with the addition of another communication interface 156 which may implement another communication protocol. For example, the second interface 156 may implement one or more PCIe ports 158, while the first interface 150 implements one or more 50 Gb Ethernet ports 152. Thus, the storage device may be implemented as a multi-mode device capable of operating in different modes using different communication protocols. For example, if the storage device 138 is implemented as a solid state drive, the two communication interfaces may enable it to operate as either an NVMe device or an NVMe-oF device while using the same U.2 connector in either mode. Moreover, the second interface 156 may implement a PCIe protocol that may also use multi-level signaling such as PAM4 in PCIe Gen 6. Thus, in some embodiments, the storage device 138 may be able to operate as either an NVMe device or an NVMe-oF device, both of which use a multi-level protocol such as PAM4. In other embodiments, the interfaces 150 and 156 may implement any other suitable combination of communication protocols. For example, either or both interfaces may implement any a network protocol such as Ethernet, Fibre Channel, InfiniBand, and the like, and either or both interfaces may implement a storage protocol such as PCIe, SAS, DATA, and the like, wherein one of the protocols may be a high-speed multi-level signaling protocol.

Multi-mode operation may be implemented, for example, by using a vendor-defined pin or reserved future use (RFU) pin as a chassis-type or protocol-selector pin. The state of the vendor defined or RFU pin on a U.2 connector, for example, may be hard-wired into the board on which the connector is mounted. As another example, a mode control pin may be controlled by logic on or connected to the board. As yet other examples, the mode of the storage drive 138 may be controlled by an in-band command, through a management control bus, or any other technique for controlling the operating mode.

In some embodiments, the storage device 138 may operate in an NVMe mode using one or more of the PCIe ports connected through pins defined for PCIe signals on the U.2 connector. The storage device 138 may operate in an NVMe-oF mode using pins normally defined for SAS signals to carry Ethernet or other network signals as a data plane and pins normally defined for PCIe lanes for a control plane. For example, a central processor unit (CPU), a baseboard management controller (BMC), and/or other devices may use PCIe lanes as a control plane to communicate with the storage device 138.

In some embodiments, the storage device 138 may use a U.3 connector, which may have the same physical design as a U.2 connector, but which may be used with a specification that may provide different pin definitions. In some embodiments, the storage device 138 may use a U.3 connector, but with pin definitions for a U.2 connector.

Any of the components and/or functionality described in the embodiments illustrated in FIGS. 8 and 9 may be implemented with hardware, software, or any combination thereof. Moreover, any of the various components may be implemented as separate components, integrated together, or arranged in any other suitable configuration. In some embodiments, if the communication interfaces are implemented with an FPGA or other logic device, the storage device may be fabricated conveniently and/or economically by adding the logic device to an existing storage device, thereby potentially reducing the manufacturing cost, time-to-market, and/or total cost of ownership (TCO) of the storage device.

Depending on the implementation details, the storage devices according to this disclosure may provide various additional benefits and advantages. For example, a storage device may be versatile because it may be used as either an NVMe or NVMe-oF device, with the further potential advantage of being able to operate with a high-speed communication protocol that may use multi-level signaling such as 50 Gb Ethernet and/or PCIe 6.0. The principles of this disclosure may also reduce the per unit cost and/or TCO, for example, because of economies of scale resulting from being able to use the same storage device as an NVMe or NVMe-oF device. The principles of this disclosure may also reduce the time-to-market of a storage device and/or storage system. Moreover, some or all of the features may be implemented using functionality that may already exist inside a system chassis and thus may have reduced cost in comparison with other approaches.

Figure 10:
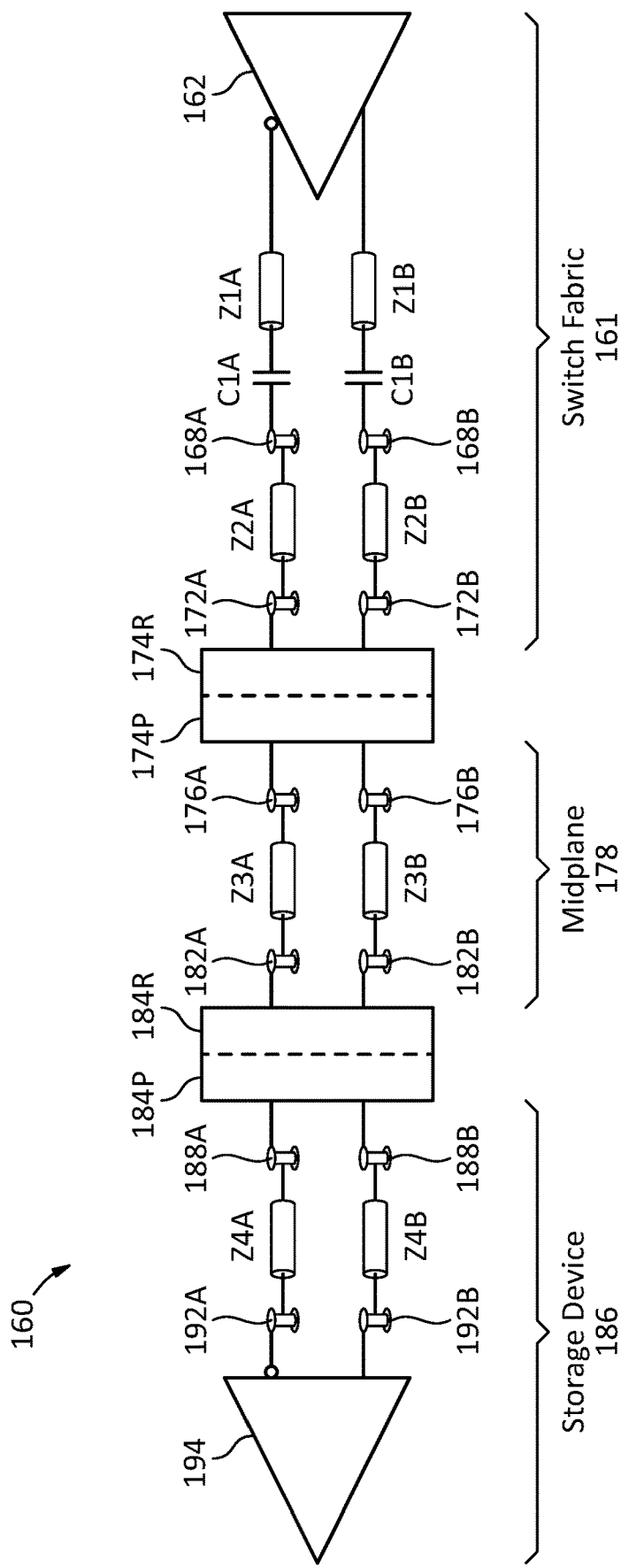
FIG. 10 illustrates a model of an embodiment of a communication channel for a data storage system according to this disclosure.

FIG. 10 illustrates a model 160 of an embodiment of a communication channel 160 for a data storage system according to this disclosure. The model illustrated in FIG. 10 is described in the context of some specific types and arrangement of components, protocols, and the like, but the principles of this disclosure are not limited to these details. Not every component illustrated in FIG. 10 may be needed for purposes of modeling and other embodiments may omit some components and/or include additional components. The model illustrated in FIG. 10 may be used, for example, to perform a signal integrity (SI) analysis of a communication channel using the high-speed protocol 110 with multi-level signaling in the system illustrated in FIG. 2.

Referring to FIG. 10, the model of the channel 160 may include a model of a differential output driver 162 on an integrated circuit (IC) mounted on a switch board. The model may also include transmission lines Z1A and Z1B and capacitors C1A and C1B which may couple the differential outputs of the output driver 162 to vias 168A and 168B. Although referred to as vias, the structures 168A and 168B, as well as other vias mentioned below, may also be realized as plated through holes, solder pads, contact pads, or any other type of structure that may provide an electrical connection between conductive traces on layers of a circuit board and/or between conductive traces and terminals of components such as ICs, resistors, capacitors, connectors, sockets, etc.

The model 160 may further include transmission lines Z2A and Z2B which may model circuit board traces between the vias 168A and 168B and vias 172A and 172B, respectively. The output driver 162 and transmission lines 164A, 1648, 170A and 170E may form all or a portion of a switch fabric 161 on the switch board. The vias 172A and 1728 may be used for mounting a receptacle portion 1748 of a high-speed connector to the switch board. A plug or header portion 174P of the high-speed connector may be mounted to the circuit board of a midplane 178 using vias 176A and 1768. The receptacle portion 1748 and plug or header portion 174P of the high-speed connector may be referred to collectively as 174. Transmission lines Z3A and Z3B may model conductive traces on the midplane 178 to vias 182A and 1828, which may be used to mount a receptacle portion 1848 of a storage device connector to the midplane 178. A plug portion 184P of the storage device connector may be mounted to a circuit board inside a storage device 186 using vias 188A and 1888. The receptacle portion 184R and plug portion 184P of the storage device connector may be referred to collectively as 184. Transmission lines Z4A and Z4B may model conductive traces between the vias 188A and 188E and vias 192A and 1928, respectively, which may be connected to the differential inputs of a receiver 194 on an IC in the storage device 186.

The model 160 illustrated in FIG. 10 may be replicated in the other direction for data flowing from the storage device 186 to the switch fabric 161.

The model 160 illustrated in FIG. 10 may be used for an SI simulation of an example embodiment of a communication channel which may be implemented with some or all of the following details. These details are provided for purposes of illustration, but the principles of this disclosure are not limited to these details.

In this example embodiment, the output driver 162 may be part of an IC having a 50 Gb Ethernet switch driving the switch fabric 161, By way of example, the Ethernet switch may comply with Institute of Electrical and Electronics Engineers (IEEE) standard 802.3cd for 50 Gb Ethernet. The Ethernet switch may further comply with the IEEE 802.3cd physical layer specification 50 GBASE-KR for transmission over a single lane of an electrical backplane. The physical layer may operate at approximately 56 Gb/s with PAM4 modulation. For example, an approximately 14 GHz signal may use two data eyes per clock cycle to provide a 28 GHz baud rate, i.e., symbols per second. By using four-level signaling, the PAM4 modulation may enable the transfer of two bits per symbol, thereby providing a data rate of about 56 Gb/s.

In this example embodiment, the high-speed connector 174 may be fabricated with conductors made from various high-performance alloys of copper and/or using gold plating on contacts. It may include a connector body made from high-performance dielectric materials and designed with a mechanical arrangement that may avoid placement of dielectric materials in areas of concentrated electromagnetic fields that may slow down and/or interfere with signal propagation. Examples of additional possible characteristics of a high-speed connector include the following: linear transmission beyond 40 GHz, differential pairs of terminals, mechanically and/or electrically matched signal lengths within differential pairs of terminals, wafer-based design, high terminal density, reduced or no stub resonances from signal contacts, and/or damping shielding, for example, 3D resonance damping shielding that may enable low crosstalk across a wide frequency spectrum. In some implementations, a high-speed connector may be specified for operation at about 112 Gbs.

In this example embodiment, the storage device connector 184 may be implemented with a U.2 connector, for example, a SAS4 capable U.2 connector. A SAS4 capable U.2 connector may be made with materials and construction techniques that may enable it to operate at clock speeds specified by the fourth generation SAS protocol and/or later generations of SAS protocols or similar protocols.

In some implementations of this example embodiment, the lengths of some or all of the circuit board traces may be kept below certain limits. For example, the traces on the switch board modeled by transmission lines 170A and 170B may be limited to about four inches in length. As another example, the traces on the midplane 178 modeled by transmission lines 188A and 188B may be limited to about 13 inches in length.

In this example embodiment, the receiver 194 may be part of an FPGA in the storage device 186 that may implement an interface for 50 Gb Ethernet. For example, if the storage device 186 is implemented as an SSD, the FPGA may enable the SSD to transfer data through the connector 186 according to the NVMe-oF specification using 50 Gb Ethernet as the underlying protocol.

Figure 11:
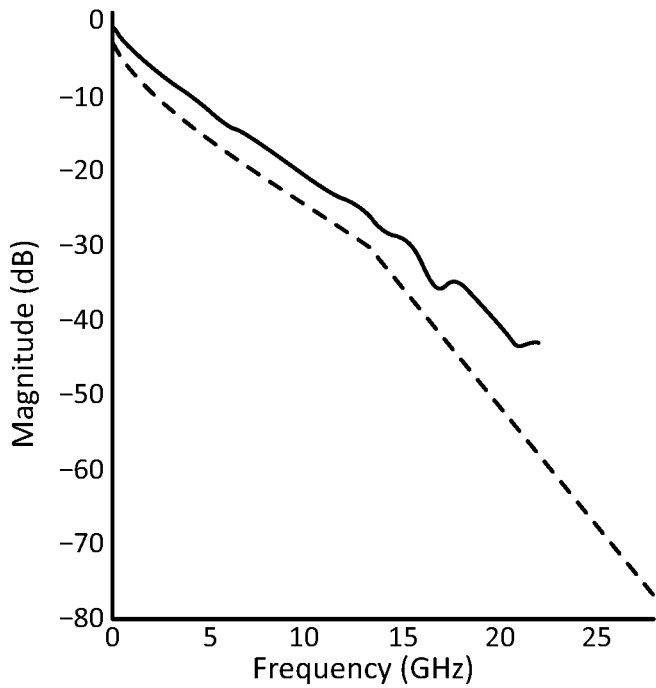
FIG. 11 illustrates insertion loss simulation results for an example embodiment of a communication channel according to this disclosure.
Figure 12:
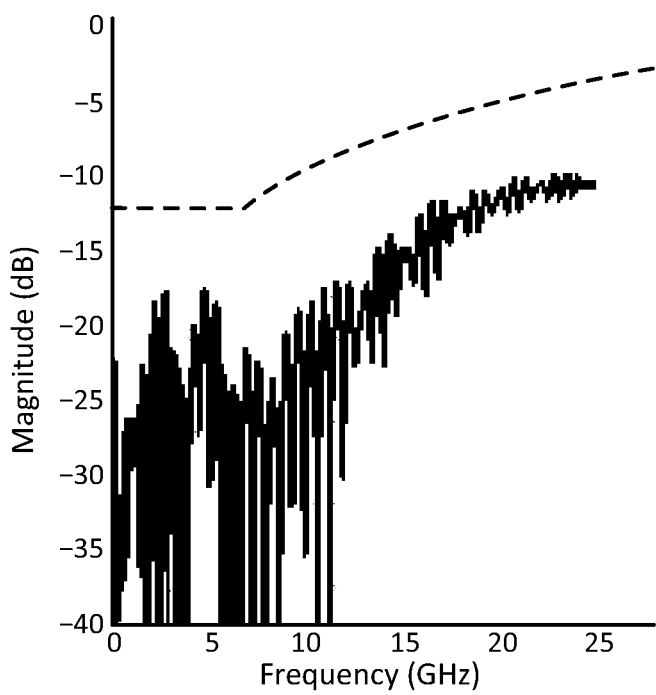
FIG. 12 illustrates return loss simulation results for an example embodiment of a communication channel according to this disclosure.

FIGS. 11 and 12 illustrate examples of the type of channel performance simulation results that may be obtained using the model of the channel 160. The results shown in FIGS. 11 and 12 are for purposes of illustrating the principles of this disclosure and may not represent the performance results of a specific physical or simulated embodiment.

FIG. 11 illustrates an insertion loss (IL) mask, i.e., limit of allowable insertion loss, for an exemplary channel specification for 50 Gb Ethernet and simulation results for an implementation of an example embodiment using the model illustrated in FIG. 10, FIG. 12 illustrates a return loss (RL) mask, i.e., limit of allowable return loss, for the exemplary channel specification and simulation results for the same implementation as used in FIG. 11. In both figures, the channel specification is shown as a dashed line, and the simulation results are shown as a solid line. As may be apparent from FIGS. 11 and 12, the simulated implementation may comply with the IL and RL specifications at the relevant operating frequencies. Moreover, the simulated implementation may also comply with an effective return loss (ERL) specification which may include a software component.

Figure 13:
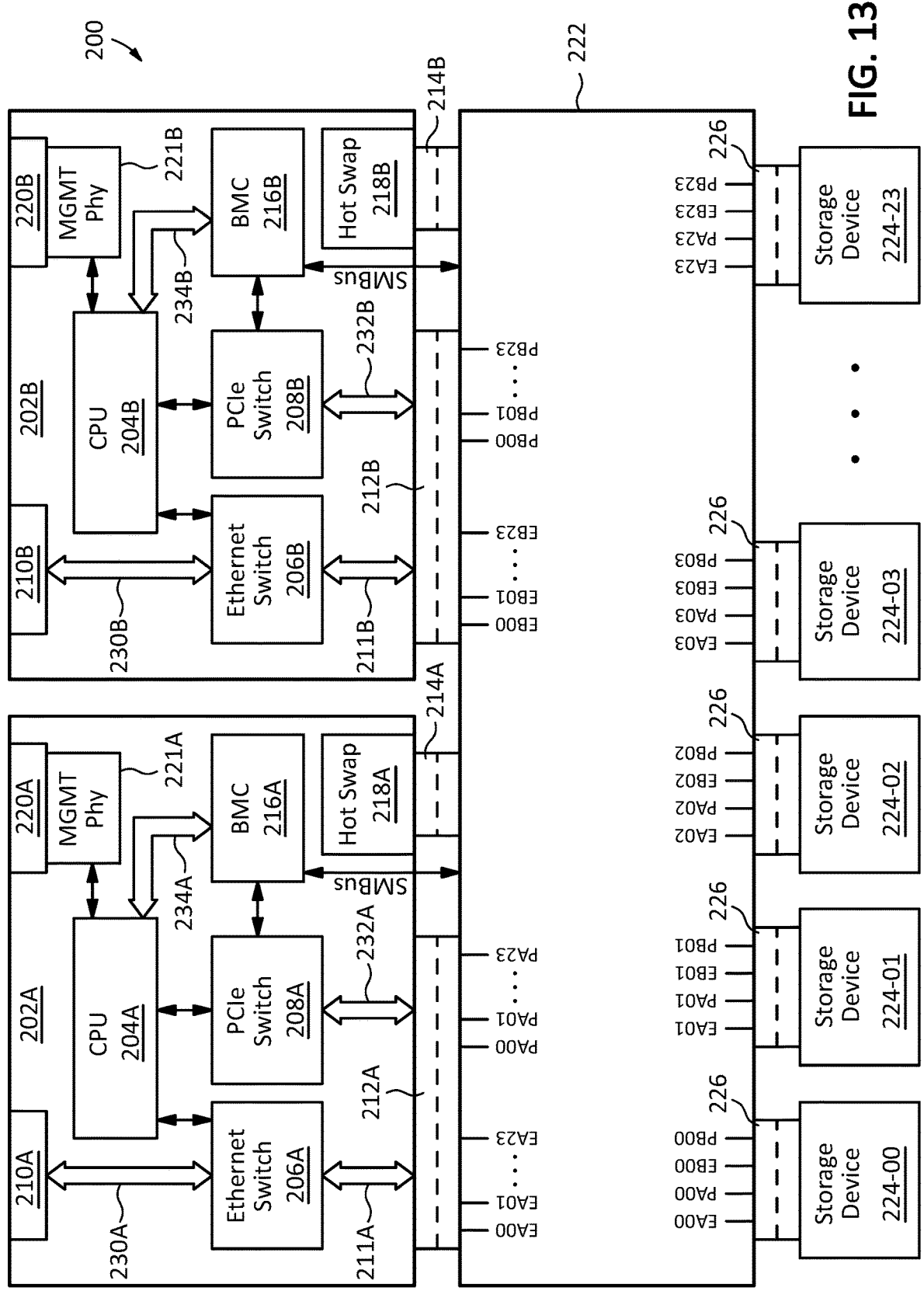
FIG. 13 illustrates an example embodiment of a data storage system illustrating some possible implementation details according to this disclosure.

FIG. 13 illustrates an example embodiment of a data storage system 200 illustrating some possible implementation details according to this disclosure. The system 200 may include two switch boards 202A and 202B. A first one of the switch boards 202A may include a CPU 204A, an Ethernet switch 206A, a high capacity or speed Ethernet connector 210A for an uplink such as a QSFP28 connector, one or more high-speed connectors 212A, one or more additional connectors 214A, a baseboard management controller (BMC) 216A, a hot swap controller 218A, a system management connector 220A, and a remote system management physical interface 221A.

The first switch board 202A may be connected to a midplane 222 through the one or more high-speed connectors 212A and the one or more additional connectors 214A. The second switch board 202B may be connected to the midplane 222 through the one or more high-speed connectors 212B and the one or more additional connectors 214B. The high-speed connectors 212A and 212E may be implemented, for example, using connectors having some or all of the characteristics of the connector 174 described above with respect to FIG. 10 which may enable the high-speed connectors 212A and 2128 to be used with high-speed communication protocols that may use multi-level signaling.

Storage devices 224-00 through 224-23, which may be referred to collectively as 224, may be connected to the midplane 222 through storage device connectors 226. In this example, there may be up to 24 or more storage devices, but the system may be configured to accommodate any number of storage devices. Although this configuration is not limited to any specific type of storage devices or connectors, in this example embodiment, connectors 226 may be SAS4 capable U.2 connectors, and the storage devices may be SSDs having FPGAs configured to provide interfaces for both 50 Gb Ethernet and PCIe (e.g., for NVMe data transfers as described above with respect to the embodiment of FIG. 9.

On the first switch board 202A, the Ethernet switch 206A may be connected to the one or more high-speed connectors 212A through conductive traces, cables, or any suitable connection arrangement 211A that may provide a 50 Gb Ethernet lane for each of the storage devices 224, for example 24×50 GBASE-KR. On the upstream side, the Ethernet switch 206A may be connected to the high capacity or speed Ethernet connector 210A through traces, cables, or any suitable connection arrangement 230A to support network traffic for the downstream storage devices 224. The high capacity Ethernet connector 210A may include, for example, multiple QSFP28 connectors.

The PCIe switch 208A may be connected to the one or more high-speed connectors 212A through conductive traces, cables, or any suitable connection arrangement 232A to provide, for example, four lanes of PCIe for each of the storage devices 224. PCIe clock distribution functionality may be provided separate from, or integral with, the PCIe switch 208A. In some embodiments, one or more of the storage devices 224 may be capable of multi-mode operation. For example, in a mode such as NVMe-oF which may use a networking protocol, some or all PCIe lanes and/or pins of one or more of the connectors 212A/B and/or 216 may be used for the network protocol. In such a mode, any unused PCIe lanes and/or pins may be used for other purposes, for example, for a control plane.

The CPU 204A may include local supporting resources such as memory, local storage, a power source, etc. The CPU 204A may perform various system management functions, as well as enabling data transfers to the storage devices 224 through the PCIe switch 208A, for example using an NVMe protocol. The CPU 204A may be connected to the Ethernet switch 206A, PCIe switch 208A, BMC 216A, and system management physical interface 221A through links having various numbers of PCIe lanes of various generational speeds as may be appropriate for the expected traffic as shown by the arrows in FIG. 13. The BMC 216A may also be connected to the PCIe switch 208A through a PCIe link as shown by the arrow in the figure. The BMC 216A may be connected to the CPU 204A through a low pin count (LPC) interface 234A.

A system management bus (SMBus) may be connected between the BMC 216A and the midplane 222 and/or storage devices 224 through one of the additional connectors 214A, through a dedicated connector, or in any other suitable manner. The one or more additional connectors 214A may provide a board-to-board power connection between the hot swap controller 218A and the storage devices 224 through the midplane 222.

The second switch board 202B may include essentially the same components and connections as the first switch board 202A, but with reference numbers ending in B instead of A.

On the midplane 222, the one or more high-speed connectors 212A and 212B may be connected to any or all of the U.2 connectors through conductive traces on the circuit board of the midplane. Channel connections between two connectors may be indicated by corresponding reference designators. For example, channel EA00 from the Ethernet switch 206A on the first switch board 202A may be connected to the first storage device 224-00 on the left side of FIG. 13 and so on. Likewise, channel PB00 from the PCIe switch 208B on the second switch board 202B may be connected to the first storage device 224-00 on the left side of FIG. 13 and so on.

In this example embodiment, the midplane traces may be routed so that a 50 Gb Ethernet lane using, for example PAM4 50 GBASE-KR, may connect each of the Ethernet switches 206A and 206B with each of the storage devices 224. Thus, each of the storage devices 224 may have a dual port 503g Ethernet connection through its U.2 connector. The midplane traces may also be routed so that a four-lane PCIe link connects each of the PCIe switches 208A and 208B with each of the storage devices 224. Thus, each of the storage devices 224 may have a dual port PCIe connection through its U.2 connector. Moreover, the use of high-speed connectors 212A and 212B and SAS4 capable U.2 connectors 226 may also enable the PCIe connections to operate at Gen 6 speeds which may use PAM4 multi-level signaling.

The system 200 illustrated in FIG. 13 may also enable the storage devices 224 to operate as multi-mode devices that may support either NVMe or NVMe-oF data transfer protocols by detecting information from a known location such as a chassis-type pin or protocol-selector pin. For example, a storage device 224 may operate in either an NVMe mode using one or more of the PCIe links or in an NVMe-oF mode using one or more of the Ethernet ports in response to the state of a vendor defined or a reserved future use (RFU) pin on the U.2 connector which may be used as a chassis-type or protocol-selector. The state of the vendor defined or RFU pin on a U.2 connector, for example, may be hard-wired into the midplane 222 and/or controlled by the SMBus.

The system 200 illustrated in FIG. 13 is not limited to the specific implementation details described above. For example, although the system is shown with two switch boards 202A and 202B, the system may be implemented with only one or with more than two switch boards. As a further example, although 50 Gb Ethernet and PCIe 6.0 are described as possible implementation details, the system 200 may also enable the use of other high-speed communication protocols, including high-speed protocols that may use multi-level signaling. As yet another example, either the Ethernet switch 206A or the PCIe switch 208A may be omitted from the first switch board 202A. Likewise, either the Ethernet switch 206B or the PCIe switch 208B may be omitted from the second switch board 202B.

Figure 14:
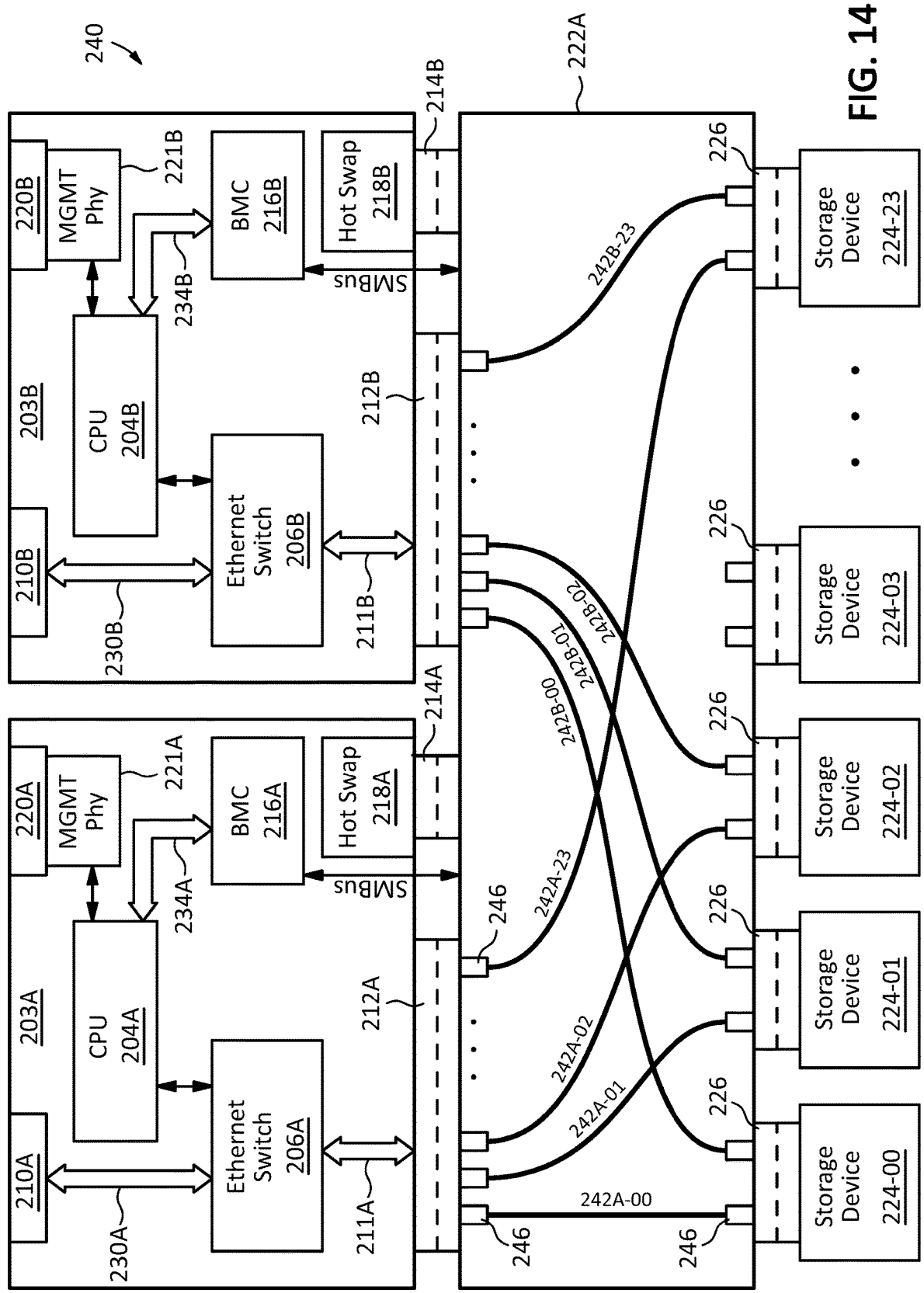
FIG. 14 illustrates an example embodiment of a data storage system illustrating some possible implementation details including cables according to this disclosure.

FIG. 14 illustrates another example embodiment of a data storage system 240 illustrating some possible implementation details according to this disclosure. The system 240 may be similar to the system 200 illustrated in FIG. 13, but in the system illustrated in FIG. 14, cables may be used instead of, or in addition to, at least some of the conductive traces on the midplane 222A to carry signals for the high-speed communication protocols with multi-level signaling. In the embodiment illustrated in FIG. 14, the switch boards 203A and 203B are shown without PCIe switches which may simplify the connections on the backplane 222A, but in other implementations, PCIe switches may be included in addition to, or in place of, the Ethernet switches 206A and 206B.

The system 240 may include cables 242A-00 through 242A-23, each of which may provide a signal path for an Ethernet channel between the one or more high speed connectors 212A and one of the U.2 connectors 226. The system 240 may also include cables 242B-00 through 242B-23, each of which may provide a signal path for an Ethernet channel between the one or more high speed connectors 212E and one of the U.2 connectors 226. The cables may be implemented with coaxial cables, twin-axial cables, or any other cable-like conductive structures that may be capable of carrying 50 Gb Ethernet or other high-speed communication protocol that may use multi-level signaling. The cables are shown having connectors 246 at either end of the cable which may form a removeable or non-removeable mechanical and/or electrical connection that may be secured with snap-in-place construction, twist-locks, mating connectors or headers, solder, screws, or any other attachment technique. The connectors 246 may perform any or all of numerous additional functions including providing strain relief, channel identification, controlled termination of the cables including impedance matching, reducing reflections, etc. To prevent the drawing from becoming obscured, not all of the cables and other components are shown, and not all of the components have reference numbers. However, the patterns of component configurations are readily apparent from the drawing.

In some embodiments, the connectors 246 may be attached to the circuit board of the backplane 222A and conductive traces may be used to complete the connections between the cables and the one or more high-speed connectors 212A and/or U.2 connectors 226. In some other embodiments, the connectors 246 may be configured to connect directly to some or all of the one or more high-speed connectors 212A and/or U.2 connectors 226.

In some embodiments, either or both ends of the cables may be connected directly to the circuit board of the backplane 222A and/or the one or more high-speed connectors 212A and/or U.2 connectors 226 without the connectors 246. The cables may be attached directly by soldering, crimping or any other suitable technique.

Some embodiments may include hybrid arrangements of cables and/or traces to connect the one or more high speed connectors 212A and U.2 connectors 226. For example, conductive traces may be used for shorter connections between connectors that may be relatively close on the midplane 222A, while cables may be used for connections between connectors that are further apart and thus would require longer traces. Depending on the implementation details, the use of cables may improve rate at which data may be transmitted between the switch board and the storage devices by, for example, reducing insertion losses, return losses and other losses associated with transmission lines, noise, cross-talk, reflections, and the like.

Figure 15:
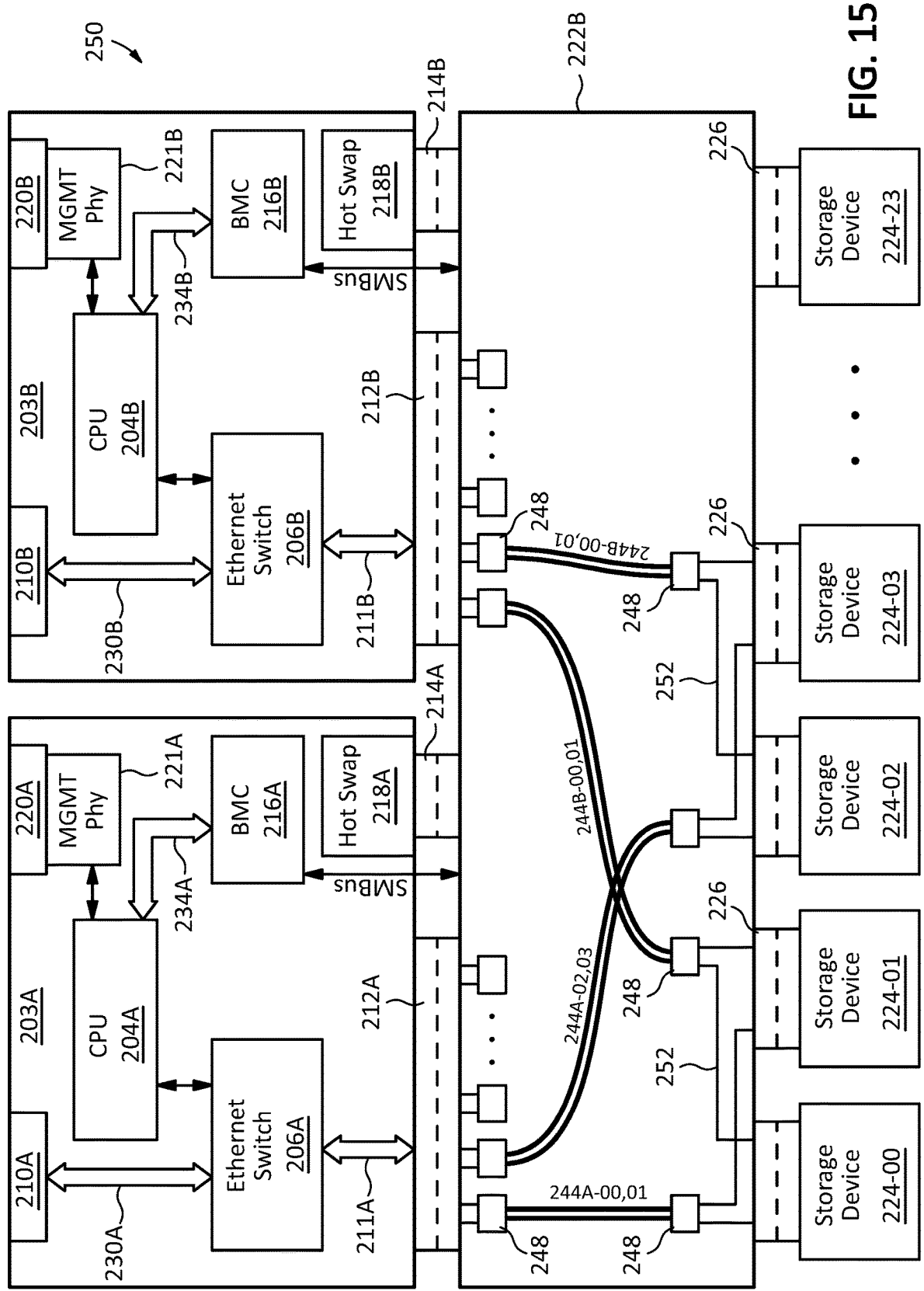
FIG. 15 illustrates an example embodiment of a data storage system illustrating some possible implementation details including multi-channel cables according to this disclosure.

FIG. 15 illustrates another example embodiment of a data storage system 250 illustrating some possible implementation details according to this disclosure. The system 250 may be similar to the system 240 illustrated in FIG. 14, but the cables may be implemented with multi-channel cable assemblies that may include one coaxial, twin-axial, or other type of cable for each of the multiple channels. In the example embodiment illustrated in FIG. 15, each assembly may include two cables, each of which may have a multi-channel connector 248 at either end. The connectors 248 may be connected to the midplane 2228 with headers, sockets, patterns of plated through holes, mating connectors, or with any other suitable technique. The multi-channel cable connectors 248 may be connected to the high-speed connectors 212A and 2126 and/or storage device connectors 226 with conductive traces 252 on the midplane 222B.

The system 250 may include multi-channel cables 244A-00,01 through 244A-22,23, each of which may provide a signal paths for a pair of Ethernet channels between the one or more high speed connectors 212A and one of the U.2 connectors 226. The system 250 may also include multi-channel cables 244B-00,01 through 244B-22,23, each of which may provide a signal paths for a pair of Ethernet channels between the one or more high speed connectors 212B and one of the U.2 connectors 226. To prevent the drawing from becoming obscured, not all of the cables and other components are shown, and not all of the components have reference numbers. However, the patterns of component configurations are readily apparent from the drawing.

As with the other embodiments described above, the embodiment illustrated in FIG. 15 may be implemented with a wide range of variations. For example, cable assemblies with 4, 8, 16 or any other number of cables per assembly may be used. In some embodiments, either or both ends of the cables in the multi-cable assemblies may be connected directly to the circuit board of the backplane 2228 and/or the one or more high-speed connectors 212A and 212B and/or U.2 connectors 226 without the connectors 248. The cables may be attached directly by soldering, crimping or any other suitable technique. In some other embodiments, the connectors 248 may be configured to connect directly to some or all of the one or more high-speed connectors 212A and/or U.2 connectors 226.

Figure 16:
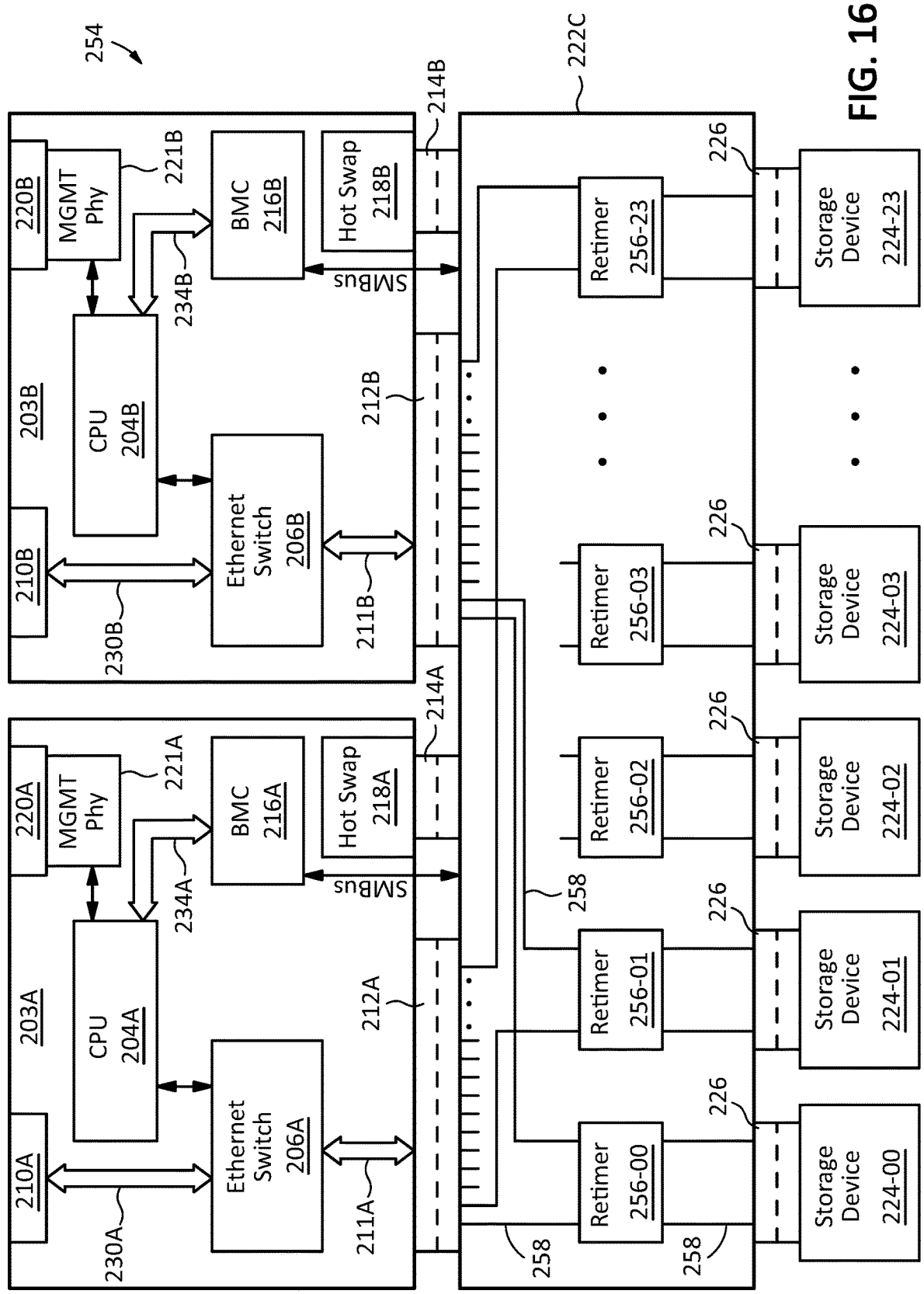
FIG. 16 illustrates an example embodiment of a data storage system illustrating some possible implementation details including re-timers according to this disclosure.

FIG. 16 illustrates another example embodiment of a data storage system 254 illustrating some possible implementation details according to this disclosure. The system 254 may be similar to the systems illustrated in FIGS. 13-15, but may include one or more re-timers 256-00 through 256-23 on the midplane 222C. The re-timers may implement any number of the following functions: equalization such as adaptive equalization and decision-feedback equalization (DFE), either of which may be linear and/or programmable; clock data recovery (CDR); and offset calibration. The re-timers may compensate for transmission line losses and inter-symbol interference. They may also compensate for deterministic and/or random jitter. Any of these functions may be implemented in receiver and/or transmitter paths.

Each of the re-timers 256-00 through 256-23 illustrated in FIG. 16 may be arranged between one of the storage devices 224 and both of the switch boards to provide dual-port Ethernet to each of the storage devices 224. This may be implemented, for example, with four-lane re-timer ICs which may use two lanes for each port, i.e., one lane in each direction for each port. The re-timers may be connected to the high-speed connectors 212A and 2123 and/or the storage device connectors 226 through conductive traces 258 on the midplane. In other embodiments, different numbers of re-timers having different numbers of lanes may be used.

Depending on the implementation details, the use of re-timers may improve the rate at which data may be transmitted between the switch board and the storage devices by, for example, by transmitting cleaner signals downstream from the re-timers. Some embodiments may include hybrid arrangements of re-timers and/or traces to connect the one or more high speed connectors 212A and 2123 with U2 connectors 226, For example, conductive traces alone may be used for shorter connections between connectors that may be relatively close on the midplane 222C, while re-timers may be used for connections between connectors that are further apart and thus may require longer traces. To prevent the drawing from becoming obscured, not all of the re-timers and/or other components are shown, and not all of the components have reference numbers. However, the patterns of component configurations are readily apparent from the drawing.

Figure 17:
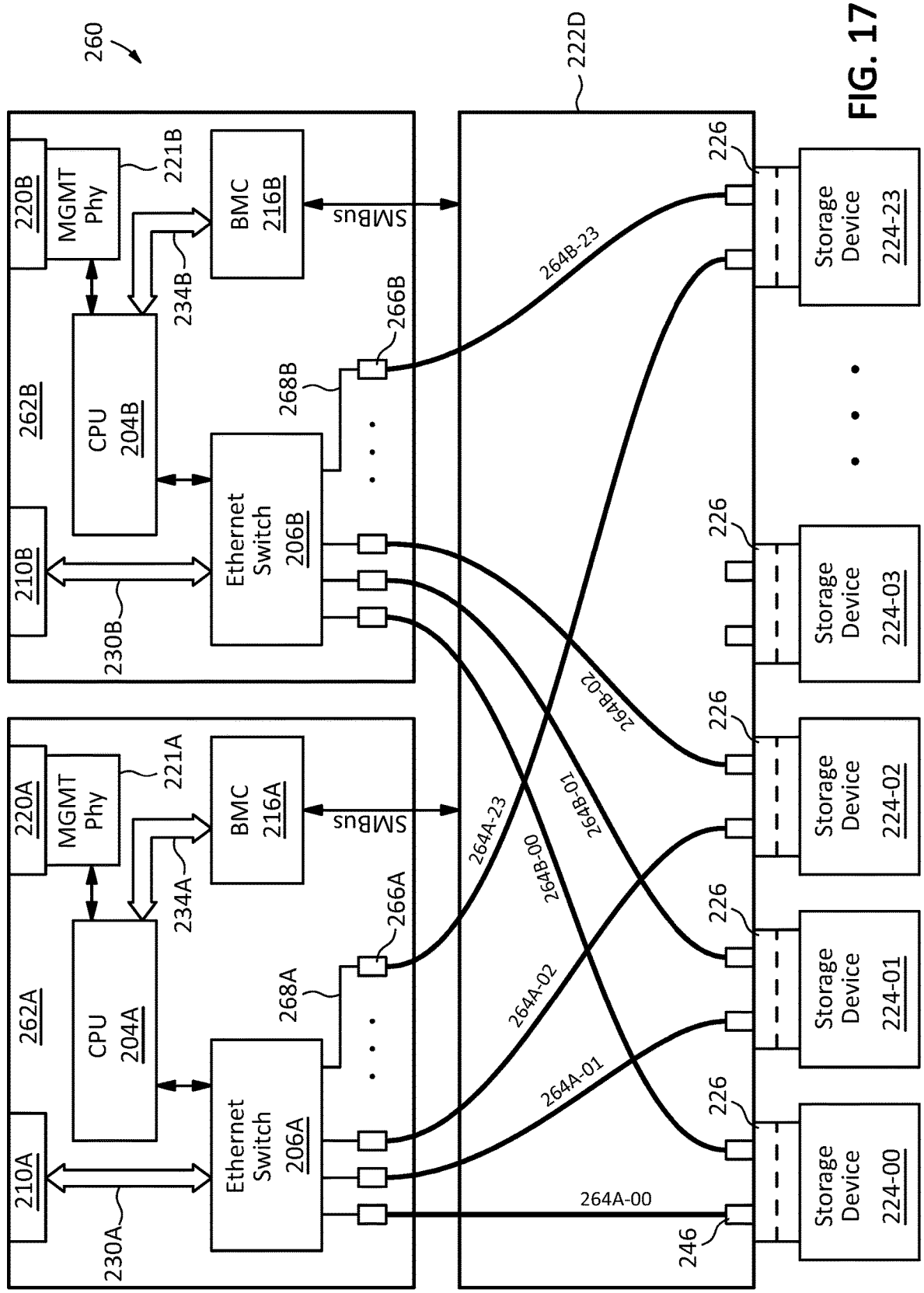
FIG. 17 illustrates an example embodiment of a data storage system illustrating some possible implementation details including cables according to this disclosure.

FIG. 17 illustrates another example embodiment of a data storage system 260 illustrating some possible implementation details according to this disclosure. The system 260 may be similar to the systems illustrated in FIGS. 14 and 15, but in this embodiment, cables may directly connect storage device connectors 226 on the midplane 222D to one or both of the switch boards 262A and 2623. In the embodiment illustrated in FIG. 17, each of cables 264A-00 through 264A-23 may be connected between the first switch board 262A and one of the storage device connectors 226. Each of cables 2643-00 through 2643-23 may be connected between the second switch board 2623 and one of the storage device connectors 226. The cables may have a connector 226A or 2263 on the switch board side, and a connector 246 on the midplane side. The connectors 226A and 2263 may be connected to the corresponding Ethernet switches 206A and 206B through traces 268A and 268B, respectively. The connectors 246 may be connected directly to the storage device connectors 226.

As with the other embodiments described above, the cables may be connected at either end, with or without the use of connectors and/or conductive traces, using any suitable connection technique. However, because the cables may be connected between the switch boards and midplane without the high-speed connectors used in other embodiments, it may be beneficial to use a cable configuration that may be easily disconnected and reconnected at one or both ends. This may include, for example, the use of cable termination connectors that snap in to mating connectors and/or patterns of conductors on the circuit boards.

Figure 18:
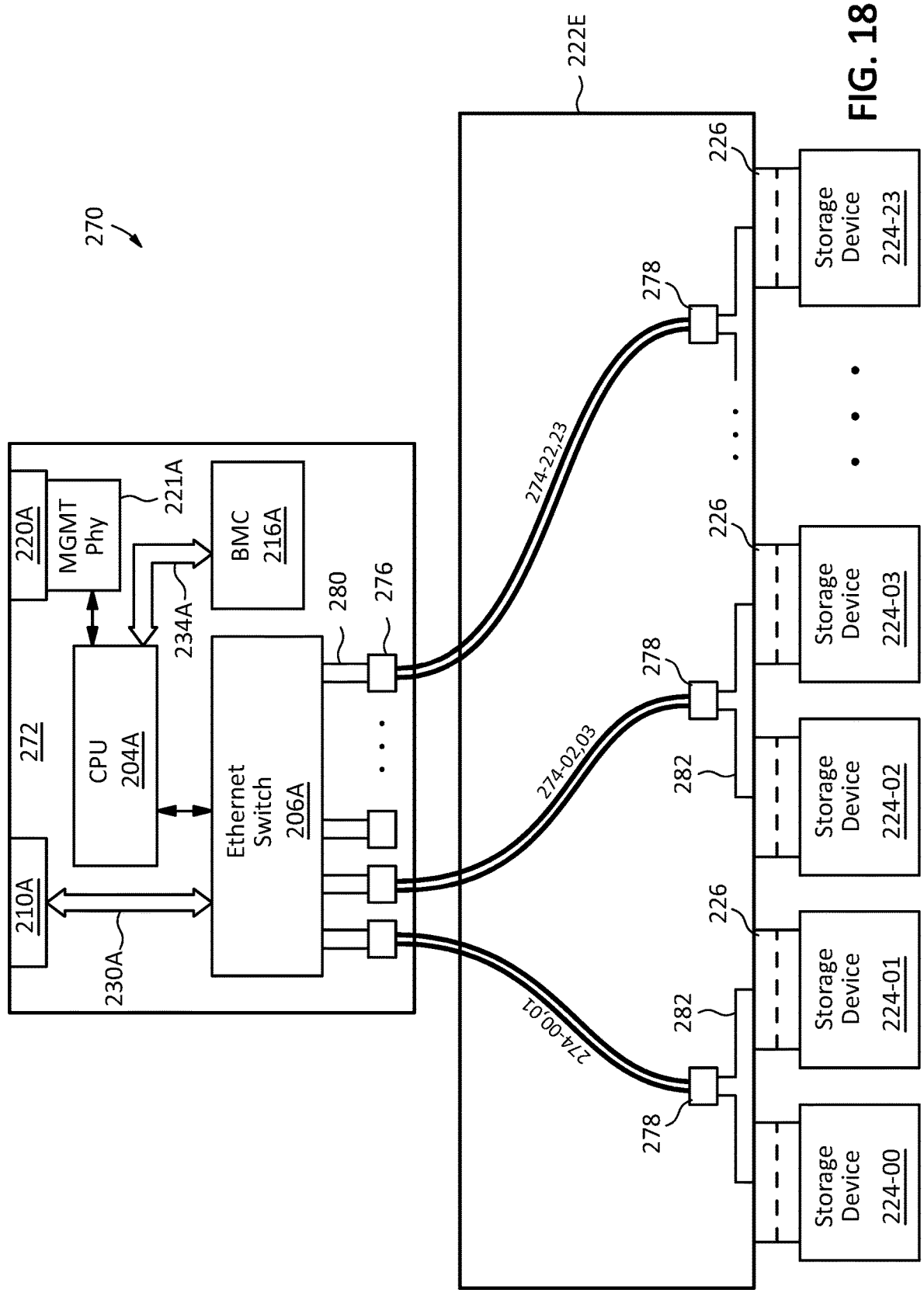
FIG. 18 illustrates an example embodiment of a data storage system illustrating some possible implementation details including multi-channel cables according to this disclosure.

Depending on the implementation details, connecting the cables directly to one or both of the switch boards may improve rate at which data may be transmitted between the switch boards and the storage devices by, for example, reducing resistive loses, insertion losses, return losses and other losses as well as noise, cross-talk, reflections, and the like that may be associated with the use of connectors between the switch boards and the midplane, FIG. 18 illustrates another example embodiment of a data storage system 270 illustrating some possible implementation details according to this disclosure. The system 270 may be similar to the system illustrated in FIG. 17, but in this embodiment, multi-channel cable assemblies 274-00,01 through 274-22,23 may be used to connect pairs of storage device connectors 262 directly to a switch board 272. The cables may have a connector 276 on the switch board side, and a connector 278 on the midplane side. The connectors 276 may be connected to the Ethernet switch 206A through traces 280 on the switch board 272, and the connectors 278 may be connected to the storage device connectors 226 through traces 282 on the midplane 222E.

As with the other embodiments described above, the multi-channel cable assemblies may be connected at either end, with or without the use of connectors and/or conductive traces, using any suitable connection technique. However, because the cable assemblies may be connected between the switch boards and midplane without the high-speed connectors used in other embodiments, it may be beneficial to use a configuration that may be easily disconnected and reconnected at one or both ends. This may include, for example, the use of cable termination connectors that snap in to mating connectors and/or patterns of conductors on the circuit boards.

The embodiments disclosed above have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not to indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. An apparatus comprising:
  a storage device comprising:
    a first connector comprising a first multi-protocol storage device connector, wherein the first multi-protocol storage device connector comprises a first pin configured to transfer data using a first protocol and a second protocol; and
    a storage controller configured to control data transfers using the first multi-protocol storage device connector and a multi-level signaling protocol, wherein the multi-level signaling protocol uses multi-level pulse amplitude modulation; and
  a circuit board comprising:
    a second multi-protocol storage device connector, comprising a second pin configured to engage with the first pin and transfer data using the first protocol and the second protocol; and
    a third connector having a configuration based on a performance characteristic comprising a linear transmission characteristic within a predetermined frequency range;
  wherein the circuit board is configured to transfer data between the second multi-protocol storage device connector and the third connector.

2. The apparatus of claim 1, wherein the circuit board is configured to transfer data using the multi-level signaling protocol.

3. The apparatus of claim 1, wherein the circuit board comprises one or more traces configured to transfer data between the second multi-protocol storage device connector and the third connector.

4. The apparatus of claim 1, wherein the second multi-protocol storage device connector comprises a U.2 compatible connector.

5. The apparatus of claim 1, wherein the performance characteristic comprises a matched signal characteristic.

6. The apparatus of claim 1, wherein the multi-level signaling protocol uses a symbol to transfer a first bit of data and a second bit of data.

7. A system comprising:
  a first circuit board configured to communicate using a multi-level signaling protocol; and
  a second circuit board having a first multi-protocol storage device connector configured to couple the second circuit board to a storage device, wherein the first multi-protocol storage device connector comprises a first pin configured to transfer data using a first protocol and a second protocol;
  wherein the multi-level signaling protocol uses multi-level pulse amplitude modulation;
  wherein the second circuit board is configured to enable the storage device to communicate, using the first multi-protocol storage device connector, using the multi-level signaling protocol, with the first circuit board;
  wherein the first multi-protocol storage device connector is configured to communicate with the first circuit board using a first cable and a second cable;
  wherein the first cable has a first connector located on the second circuit board to communicate with the first multi-protocol storage device connector, and a second connector located on the first circuit board;
  wherein the second cable has a third connector located on the second circuit board to communicate with a third multi-protocol storage device connector, and a fourth connector located on the first circuit board; and
  wherein the storage device comprises:
    a second multi-protocol storage device connector comprising a second pin configured to transfer data using the first protocol and the second protocol; and
    a storage controller configured to control data transfers using the second multi-protocol storage device connector and the multi-level signaling protocol.

8. The system of claim 7, wherein the second circuit board is coupled to the first circuit board using a circuit board connector.

9. The system of claim 7, wherein the second circuit board comprises one or more traces configured to connect the first connector of the first cable to the first multi-protocol storage device connector.

10. The system of claim 7, wherein the first connector of the first cable is physically coupled to the first multi-protocol storage device connector.

11. The system of claim 7, wherein the first multi-protocol storage device connector comprises a U.2 compatible connector.

12. A method comprising:
receiving, at a circuit board, using a multi-level signaling protocol, data; and
sending, from the circuit board, to a storage device, using the multi-level signaling protocol, the data;
wherein the multi-level signaling protocol uses multi-level pulse amplitude modulation;
wherein the receiving is performed using a first connector having a configuration based on a performance characteristic comprising a matched signal characteristic;
wherein the sending is performed using a second connector comprising a first multi-protocol storage device connector comprising a first pin configured to transfer data using a first protocol and a second protocol; and
wherein the storage device comprises:
a third connector comprising a second multi-protocol storage device connector comprising a second pin configured to transfer data using the first protocol and the second protocol; and
a storage controller configured to control data transfers using the second multi-protocol storage device connector and the multi-level signaling protocol.

13. The method of claim 12, wherein the multi-level signaling protocol uses pulse amplitude modulation.

14. The method of claim 13, wherein the pulse amplitude modulation comprises pulse amplitude modulation level-4 (PAM4) modulation.

15. The method of claim 12, wherein the multi-level signaling protocol comprises a network protocol.

16. The method of claim 12, wherein the receiving is performed using a non-volatile memory express over fabric (NVMe-oF) protocol.

17. The method of claim 12, wherein the first multi-protocol storage device connector comprises a U.2 compatible connector.

18. The method of claim 12, wherein the first multi-protocol storage device connector is compliant with a Small Form Factor 8639 (SFF-8639) specification.

19. The method of claim 12, wherein the performance characteristic comprises a linear transmission characteristic within a predetermined frequency range.

20. The method of claim 12, wherein the multi-level signaling protocol uses a symbol to transfer a first bit of data and a second bit of data.

* * * * *